United States Patent
Anderson et al.

(10) Patent No.: US 8,977,972 B2
(45) Date of Patent: Mar. 10, 2015

(54) USING MULTI-MODAL INPUT TO CONTROL MULTIPLE OBJECTS ON A DISPLAY

(75) Inventors: Glen J. Anderson, Beaverton, OR (US); Rina A. Doherty, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 641 days.

(21) Appl. No.: 12/655,583

(22) Filed: Dec. 31, 2009

(65) Prior Publication Data

US 2011/0161890 A1     Jun. 30, 2011

(51) Int. Cl.
*G06F 3/048* (2013.01)
*G06F 3/01* (2006.01)
*G06F 3/0488* (2013.01)
*G06F 3/038* (2013.01)
*H04N 5/44* (2011.01)

(52) U.S. Cl.
CPC ............ *G06F 3/017* (2013.01); *G06F 3/04883* (2013.01); *H04N 2005/4432* (2013.01); *G06F 3/01* (2013.01); *G06F 3/013* (2013.01); *G06F 3/038* (2013.01); *G06F 2203/0381* (2013.01)
USPC ........... 715/764; 715/767; 715/765; 715/863; 715/831; 345/156; 345/157; 345/158

(58) Field of Classification Search
CPC ................ G06F 3/04883; G06F 2203/0381; G06F 3/017; G06F 3/01; H04N 2005/4432
USPC .......... 715/863, 764, 765, 767, 831; 345/156, 345/157, 158
See application file for complete search history.

(56) References Cited

U.S. PATENT DOCUMENTS

| | | | | |
|---|---|---|---|---|
| 5,339,389 A | * | 8/1994 | Bates et al. | 715/742 |
| 5,586,243 A | * | 12/1996 | Barber et al. | 715/856 |
| 5,884,249 A | * | 3/1999 | Namba et al. | 704/9 |
| 5,900,869 A | * | 5/1999 | Higashio | 715/751 |

(Continued)

FOREIGN PATENT DOCUMENTS

| | | |
|---|---|---|
| CN | 101322091 A | 12/2008 |
| EP | 1286252 A3 | 6/2006 |

(Continued)

OTHER PUBLICATIONS

European Search Report received for European Patent Application No. GB1021412.0, mailed on Apr. 27, 2011, 11 pages.

(Continued)

*Primary Examiner* — Patrick Riegler
(74) *Attorney, Agent, or Firm* — International IP Law Group, P.L.L.C.

(57) ABSTRACT

Embodiments of the invention are generally directed to systems, methods, and machine-readable mediums for implementing gesture-based signature authentication. In one embodiment, a system may include several modal input devices. Each modal input device is capable of retrieving a stream of modal input data from a user. The system also includes modal interpretation logic that can interpret each of the retrieved modal input data streams into a corresponding of set of actions. The system additionally includes modal pairing logic to assign each corresponding set of actions to control one of the displayed objects. Furthermore, the system has modal control logic which causes each displayed object to be controlled by its assigned set of actions.

21 Claims, 9 Drawing Sheets

(56) References Cited

U.S. PATENT DOCUMENTS

| | | |
|---|---|---|
| 6,345,111 B1 * | 2/2002 | Yamaguchi et al. .......... 382/118 |
| 6,570,555 B1 * | 5/2003 | Prevost et al. ................ 345/156 |
| 6,885,361 B1 * | 4/2005 | Harvill et al. ................. 345/156 |
| 7,225,414 B1 * | 5/2007 | Sharma et al. ................ 715/863 |
| 2002/0041327 A1 | 4/2002 | Hildreth et al. |
| 2002/0128552 A1 * | 9/2002 | Nowlin et al. ................ 600/427 |
| 2004/0193413 A1 * | 9/2004 | Wilson et al. ................. 704/243 |
| 2006/0033713 A1 | 2/2006 | Pryor |
| 2006/0066571 A1 * | 3/2006 | Fairs et al. .................... 345/157 |
| 2006/0100881 A1 * | 5/2006 | He ............................... 704/270 |
| 2007/0015558 A1 | 1/2007 | Zalewski et al. |
| 2007/0083820 A1 | 4/2007 | Blythe et al. |
| 2008/0209346 A1 * | 8/2008 | Chang ........................... 715/754 |
| 2008/0225041 A1 | 9/2008 | Dokor et al. |
| 2009/0066638 A1 * | 3/2009 | Moulios et al. ............... 345/156 |
| 2009/0085871 A1 * | 4/2009 | Bhogal et al. ................. 345/163 |
| 2010/0009746 A1 * | 1/2010 | Raymond et al. .............. 463/31 |
| 2010/0144436 A1 * | 6/2010 | Marks et al. ................... 463/36 |

FOREIGN PATENT DOCUMENTS

| | | |
|---|---|---|
| EP | 2077496 A1 * | 7/2009 |
| WO | 2004107150 A1 | 12/2004 |
| WO | 2006060288 A3 | 6/2006 |
| WO | 2007/130691 A2 | 11/2007 |
| WO | 2007130691 A2 | 11/2007 |
| WO | 2008069519 A1 | 6/2008 |

OTHER PUBLICATIONS

Office Action received for United Kingdom Patent Application No. 1021412.0, mailed on Mar. 30, 2012, 3 pages.

Office Action received for German Patent Application No. 102010055219.4, mailed on Dec. 12, 2012, 5 pages of Office Action and 2 pages of English Translation.

Office Action and Search Report received of Chinese Patent Application No. 201010622956.7, mailed on Feb. 16, 2013, 8 pages of Office Action and 8 pages of English Translation.

Office Action received for Chinese Patent Application No. 201010622956.7, mailed on Oct. 21, 2013, 13 pages of Office Action including 7 pages of English Translation.

* cited by examiner

USING MULTI-MODAL INPUT TO CONTROL MULTIPLE OBJECTS ON A DISPLAY

TECHNICAL FIELD

Embodiments of the invention generally relate to the field of integrated circuits and, more particularly, to systems, methods, and devices utilized to control objects on a display through the use of multi-modal input.

BACKGROUND

Gesture input has become very popular with the Nintendo® Wii™ and other gaming devices. As integrated cameras and array microphones become more common in computing products, methods of input such as gesture, voice, and gaze (use of eyes or movement of the head), will become a more common means of input.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments are generally directed to systems, methods, and apparatuses for using multi-modal input to control objects on a display.

In many embodiments, a process to use multi-modal input to control displayed objects involves receiving several streams of modal input. The modal input may be input from any type of modal input device. For example, modal input devices may include video cameras, microphones, motion detectors such as accelerometers, skin-attached electrical measurement equipment to detect electrical fields/impulses in the brain or in muscle tissue, or other such devices. Types of modal input that modal input devices may be capable of capturing (i.e., recording) are eye movement (i.e., eye gaze direction), head movement, arm and hand movement, leg and feet movement, voice commands, as well as many other forms of modal input.

A "stream" of modal input refers to a stream of data captured by one of these modal input devices. For example, a video camera might be trained on a user's eye movements. The video camera might record 60 frames of video per second of a close up perspective of the user's eyes. These frames may be referred to as the stream of modal input data. Other streams include audio capture streams as well as coordinate data streams from motion capture devices, such as a Nintendo® Wii™ remote, that may provide three dimensional coordinates of the location of the device every certain number of milliseconds.

Several of these streams of modal input may be received into a computing device. Each stream is then interpreted by logic within the computing device to ascertain a set of actions.

The set of actions is then assigned to an object on a display device. A television set might be a display device utilized. The object on the television set may be a virtual hand, a virtual leg, a ball, or one of many other types of objects that may be displayed. Additionally, in many embodiments, the object may be a virtual point-of-view camera perspective of the screen. In other words, by manipulating the camera perspective, the view of what is seen on the screen may change. For example, if the eye gaze turns from left to right, a virtual world that may be displayed upon the screen may swivel to the right in response. Essentially, the process allows the set of actions to be attached to an object displayed (or related to the display of what is seen) and the object is therefore manipulated dynamically on the display by the actions.

An example of the process utilizes a stream of user eye movement. If the user's eyes change from looking to the left to looking to the right, the interpretation logic discerns this movement and creates actionable commands pertaining to the movement potentially coupled with a time stamp. A single action in the set might look something like this: (eye gaze: 30° left of center, 15° down of center; time: 10:17:57.098).

Figure 1:
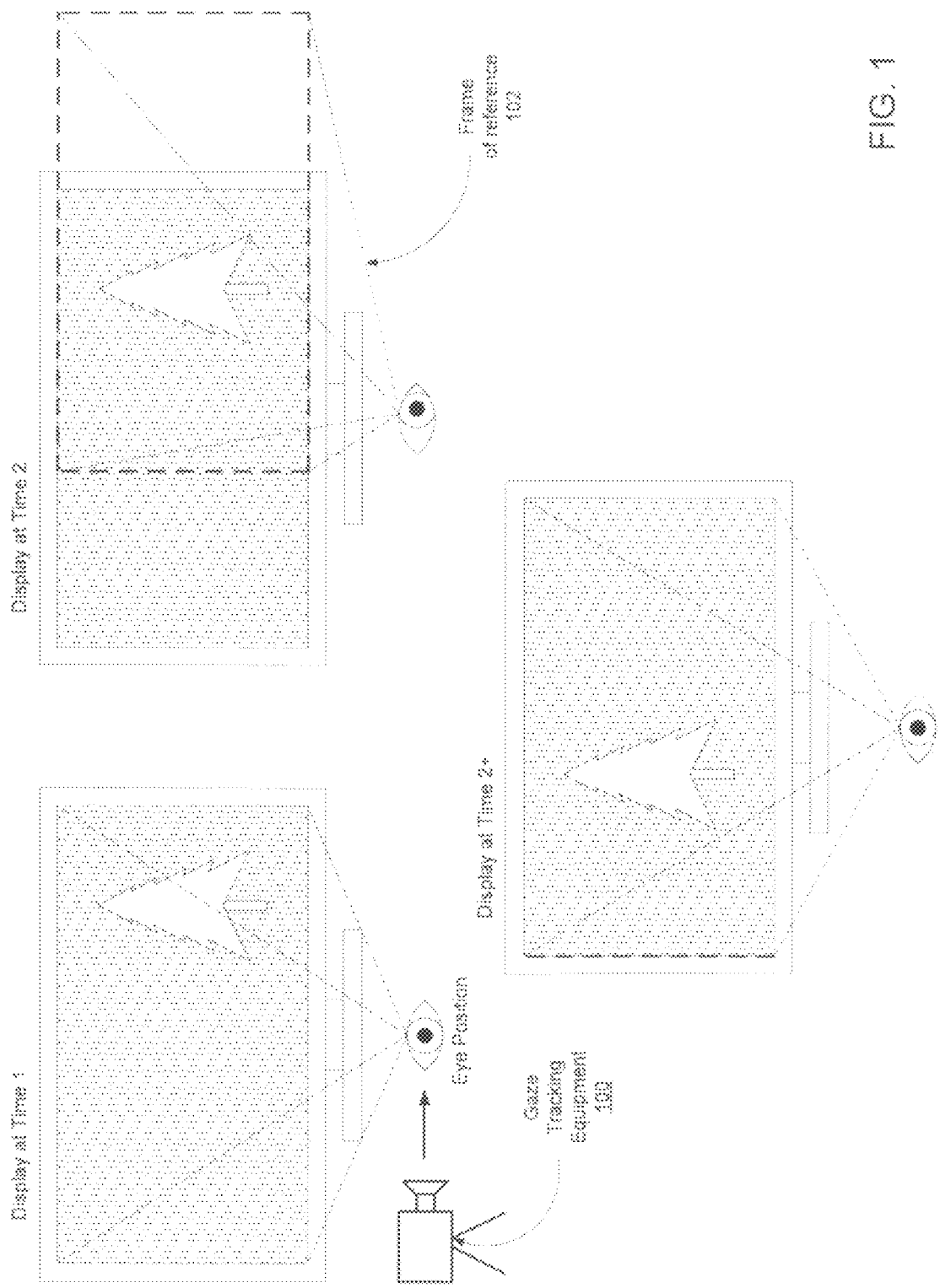
FIG. 1 illustrates an embodiment of eye gaze modal input manipulating what is seen on the display.

FIG. 1 illustrates an embodiment of eye gaze modal input manipulating what is seen on the display. The display at time 1 shows the user's eye position being centered on the screen, which shows a displayed environment with a tree on the right side of the screen. This eye position is tracked by gaze tracking equipment 100 (e.g., a video camera which is potentially on a user head mount). At time 2, the display is showing the same environment position, but all of a sudden the user's eye gazes to the right, which is recorded by the gaze tracking equipment 100.

The eye movement can then be interpreted, which reveals a desired environment frame of reference that is partially to the right of the current displayed environment. The interpretation logic then creates a set of actions that controls the point-of-view to move right, which shows that at time 2+ the tree (which was on the right of the screen at time 1 and time 2) has moved more into the center of the screen due to the eye movement. This has satisfied the user because the desired point-of-view has now centered on the display and so the user's eyes are once again centered on the display.

Figure 2:
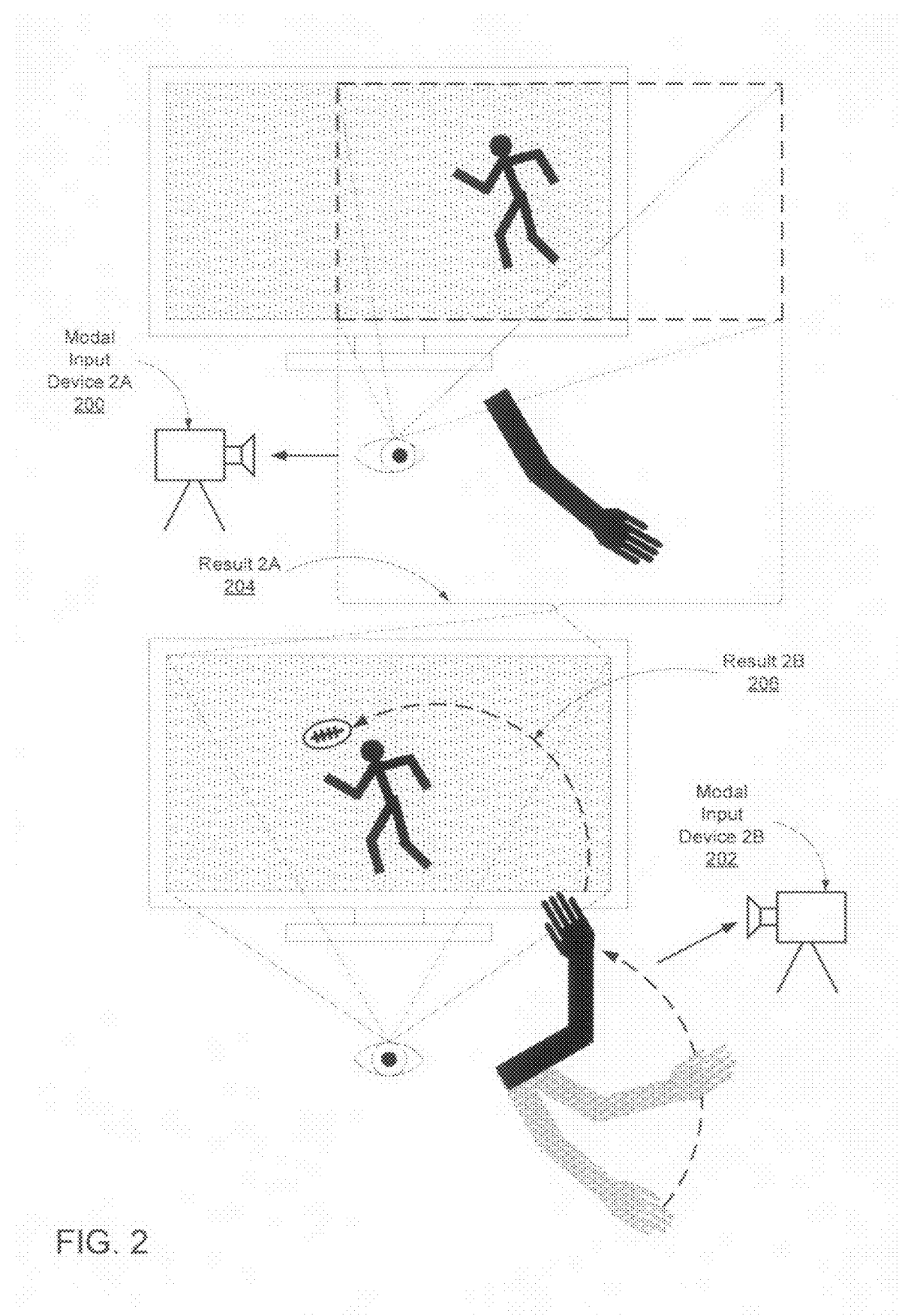
FIG. 2 illustrates an embodiment of multi-modal input by a user to control objects on a display.

FIG. 2 illustrates an embodiment of multi-modal input by a user to control objects on a display. FIG. 2 specifically utilizes eye gaze movement and arm gesture movement as the two types of modal input. Specifically, the user's eye gaze movement is tracked by modal input device 2A (200) and the arm gesture movement is tracked by modal input device 2B (202). The user's eye gaze movement is assigned to manipulate the frame of reference of the display and the user's arm movement is assigned to manipulate a virtual quarterback arm on the display.

When the user shifts his gaze to the right, the point-of-view changes to the new frame of reference. This is denoted by result 2A (204), which shows the bracket corresponding to the top display frame of reference being modified to center on the screen. This causes the football player to move from the right side of the display to the center.

As this is taking place, the user makes a throwing motion (i.e., gesture) with his/her arm. This gesture is captured by modal input device 2B 202. Interpretation logic interprets the throwing motion arm gesture and controls a virtual quarterback arm on the display to throw a football to the football player, which is result 2B (206).

Figure 3:
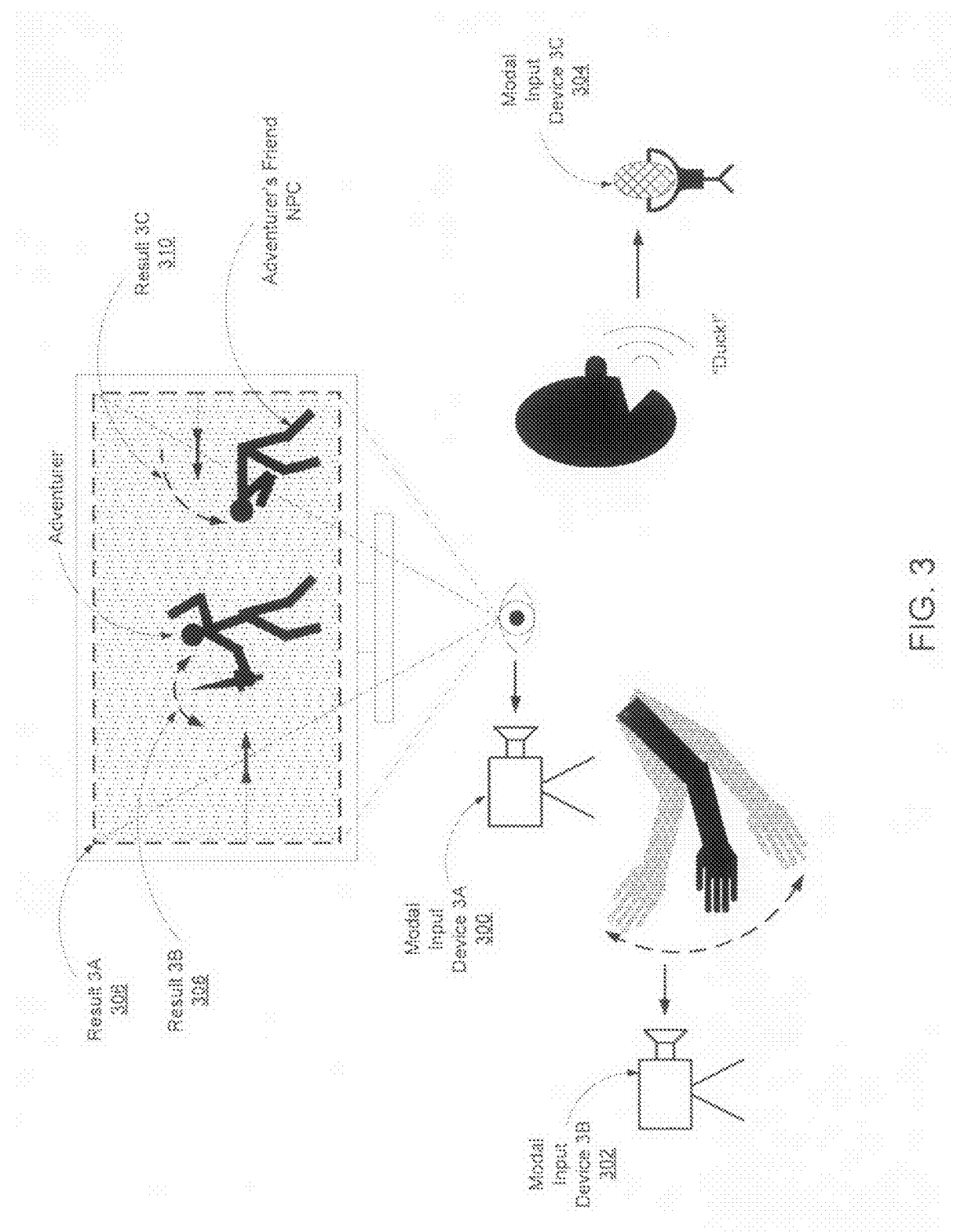
FIG. 3 illustrates another embodiment of multi-modal input by a user to control objects on a display.

FIG. 3 illustrates another embodiment of multi-modal input by a user to control objects on a display. FIG. 3 specifically utilizes eye gaze movement, arm gesture movement, and voice commands as the three types of modal input. Specifically, the user's eye gaze movement is tracked by modal input device 3A (300), the arm gesture movement is tracked by modal input device 3B (302), and the user's voice commands are recorded by modal input device 3C (304). The user's eye gaze movement is assigned to manipulate the frame of reference of the display, the user's arm movement is assigned to manipulate a virtual adventure's arm wielding a weapon, and the user's voice commands are assigned to manipulate what a non-player character (NPC) adventurer friend will do to help the adventurer on the display.

When the user shifts his gaze left or right, the point-of-view changes to the new frame of reference. This is denoted by result 3A (306), which shows that currently the user has his/her frame of reference centered on the screen so no movement is necessary.

Simultaneous to the modal input user eye gaze tracking, the user makes a motion (i.e., gesture) with his/her arm. This gesture is captured by modal input device 3B 302. Interpretation logic interprets the arm gesture and controls the adventurer's arm to attack, block, etc. with the adventurer's virtual weapon in hand.

Furthermore, simultaneous to the modal input user eye gaze tracking and modal input user arm gesture tracking, the user voices action commands as instructions for the adventurer's NPC friend. For example, the user might notice an arrow about to hit the adventurer's friend and yell "Duck!" to have the NPC friend duck out of the arrow's way. Any number of voice commands may be interpreted (e.g., jump, attack, sit down, etc.). Thus the user, through the simultaneous modal inputs of his/her eyes, arms, and voice, may be manipulating several objects on the display at once.

Figure 4:
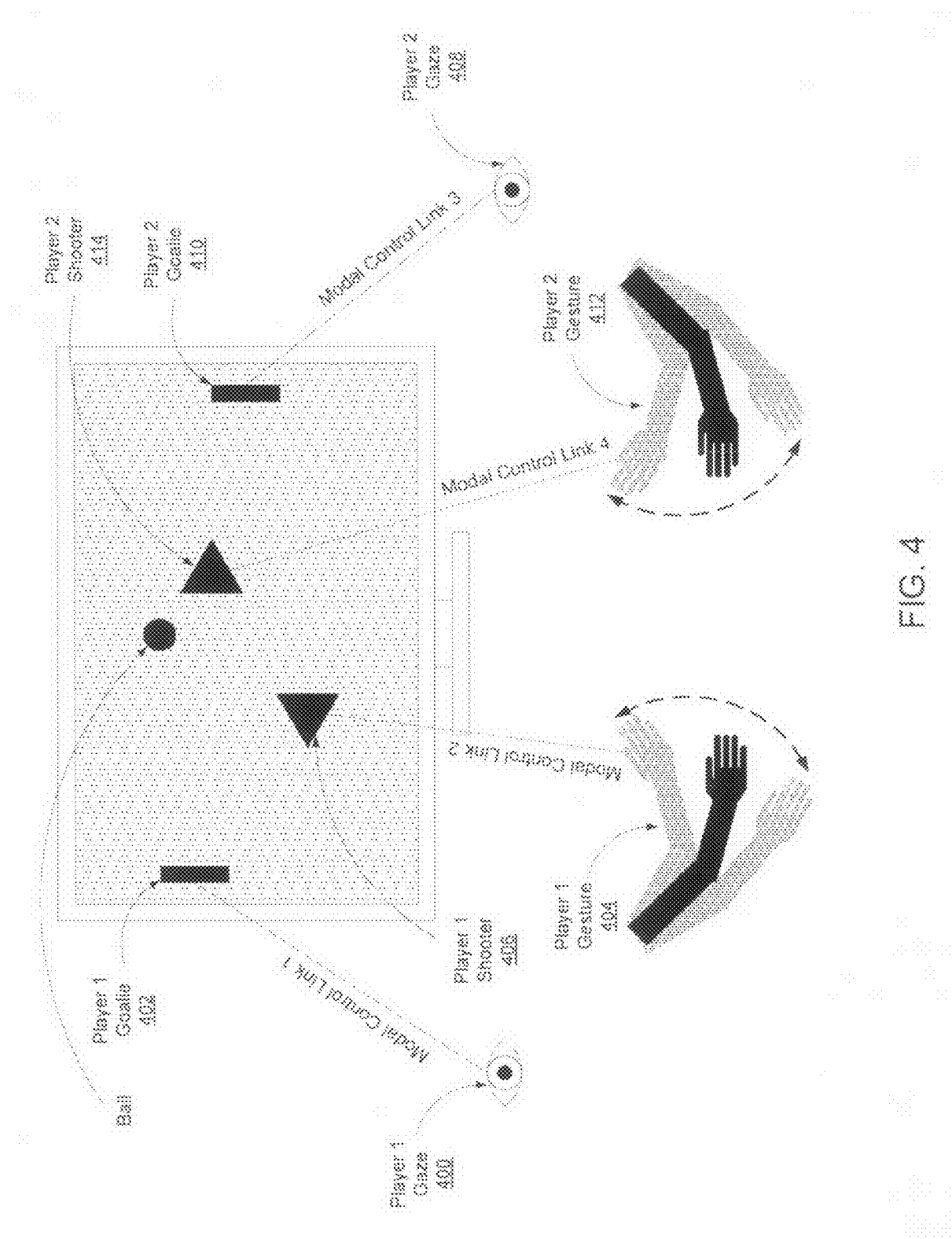
FIG. 4 illustrates an embodiment of multi-modal input by each of two users to control objects on a display.

FIG. 4 illustrates an embodiment of multi-modal input by each of two users to control objects on a display. FIG. 4 specifically utilizes eye gaze movement and arm gesture movement as the two types of modal input. Although not shown in FIG. 4, the same or similar modal input devices may be used to track user eye gaze movement and arm gesture movement. Player 1's eye gaze movement controls the player 1 goalie 402 movement, this assignment is visualized through modal control link 1. Player 1's arm gesture movement 404 controls player 1 shooter 406 movement, visualized through modal control link 2. Player 2's eye gaze movement 408 controls the player 2 goalie 410 movement, visualized through modal control link 3. Finally, Player 2's arm gesture movement 412 controls player 2 shooter 414 movement, visualized through modal control link 4.

Figure 5:
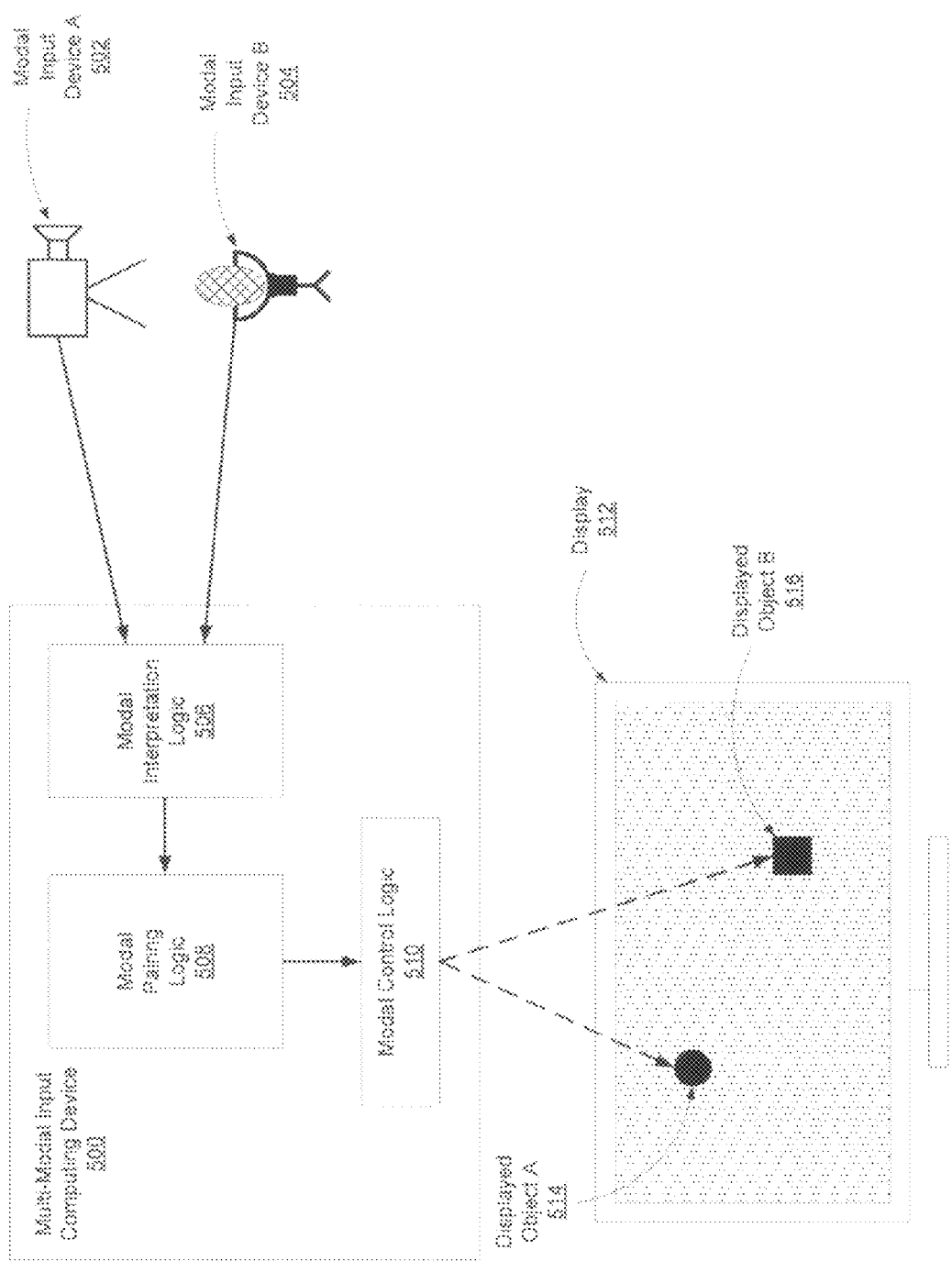
FIG. 5 is a block diagram of an embodiment of a modular multi-modal input system.

FIG. 5 is a block diagram of an embodiment of a modular multi-modal input system.

Multi-modal input computing device 500 may be any type of computing device, such as a desktop computer, server, workstation, laptop, handheld device, television set-top device, media center device, game console, integrated system device (such as in a car), or other type of computing device. The computing device may be coupled to several modal input devices such as modal input device A 502 (a video camera) and modal input device B 504 (a microphone). In other embodiments, there are other and potentially many more modal input devices, such as entire arrays of microphones or video cameras, motion detection devices, location aware devices (such as a global positioning system capable device), among other types of modal input devices.

Each of the modal input devices is coupled to modal interpretation logic 506. As discussed above, modal interpretation logic 506 may be capable of interpreting a modal input data stream into a set of actions/commands. The set of actions is sent to modal pairing logic 508 which creates pairs of a modal input with a display object. The pair information, as well as the sets of actions are then fed to modal control logic 510, which receives the actions/commands and uses the pair data to determine which object displayed on display 512 is controlled with which set of actions.

For example, modal input device A 502 may be paired with displayed object A 514 and modal input device B 504 may be paired with displayed object B 516. The multi-modal input process is modular in the sense that modal pairing logic 508 may disassociate a given modal input data stream with a first displayed object and re-associate the same stream with a second object. Thus, an input stream may be switched from controlling a first object to controlling a second object at any time. Additionally, an object may be switched from being controlled by a first stream to being controlled by a second stream.

In many embodiments, modal pairing logic 508 may implement a user interface to give the user the ability to explicitly assign each input modality to a display object or other controlled element (such as the point-of-view eye gaze implementation). Thus, in many embodiments, the user may enter into a user interface that has a first list of available input modalities and a second list of available display objects/elements/functions to control. The user can then explicitly pair each modality with an object/etc. This information may then be used by modal pairing logic 508 during operation of the system.

Additionally, it is not necessarily the case that any input stream would have the ability to control any object, but if there are any restrictions, those may be predetermined and implemented by restricting certain user settings to program into modal pairing logic.

Figure 6:
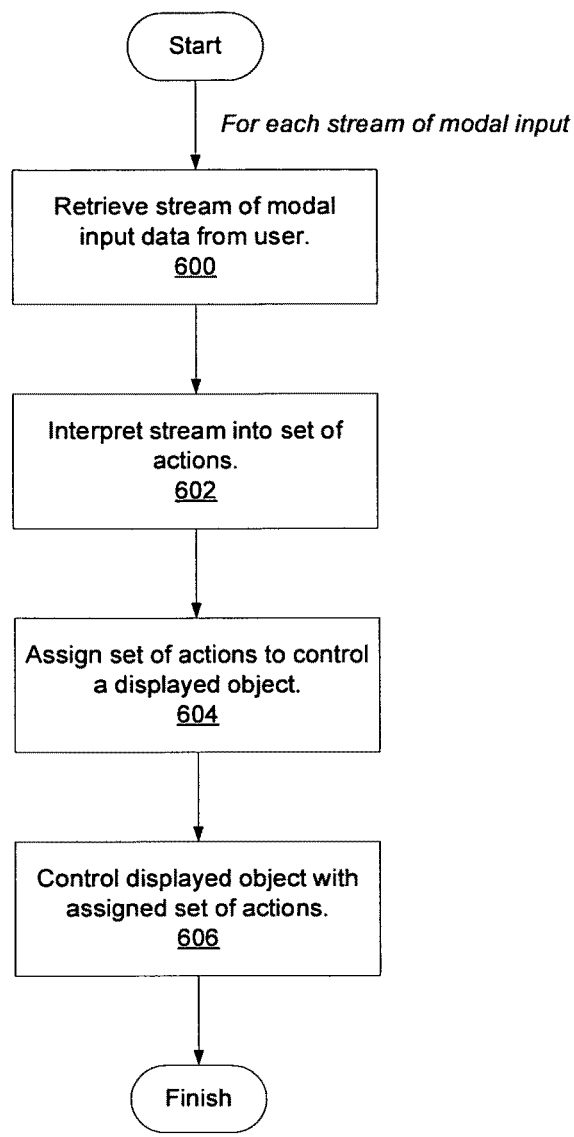
FIG. 6 is a flow diagram of an embodiment of a process to utilize a modal input stream to control a displayed object.

FIG. 6 is a flow diagram of an embodiment of a process to utilize a modal input stream to control a displayed object.

The process is performed by processing logic which may include hardware (e.g., circuitry in a general purpose computer), software (e.g., OS or software application code), firmware (e.g., microcode or basic input/output system (BIOS) code), or a combination of any two or more of these forms of processing logic. The process in FIG. 6 is related to a single stream of modal input. In many embodiments, this process is performed for each stream of modal input.

The process begins by processing logic retrieving a stream of modal input data from a user (processing block 600). Next, processing logic interprets the stream of modal input data into a set of actions or commands (processing block 602). Then, processing logic assigns the set of actions/commands to control a particular displayed object (processing block 604). Finally, processing logic utilizes the set of actions to control the assigned displayed object (processing block 606).

Figure 7:
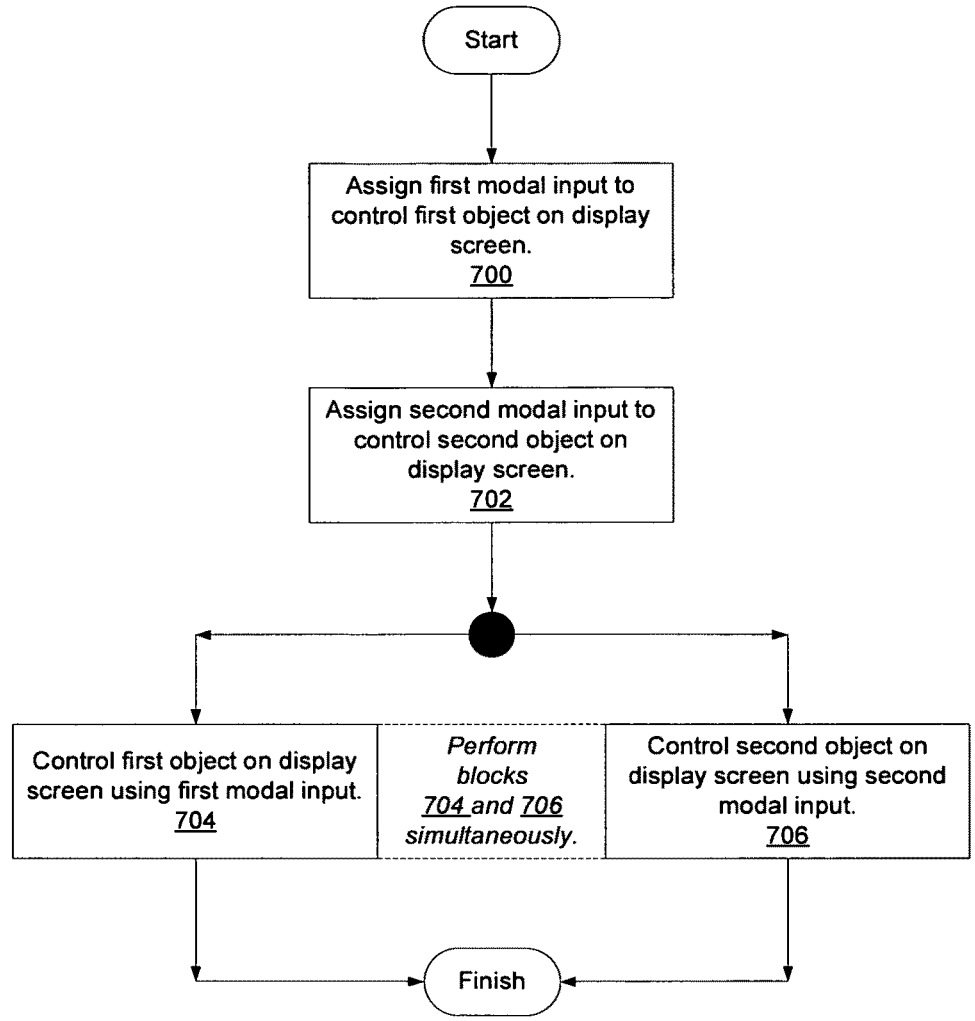
FIG. 7 is a flow diagram of an embodiment of a process to utilize multi-modal inputs to simultaneously control more than one displayed object.

FIG. 7 is a flow diagram of an embodiment of a process to utilize multi-modal inputs to simultaneously control more than one displayed object.

Again, the process is performed by processing logic which may include hardware (e.g., circuitry in a general purpose computer), software (e.g., OS or software application code), firmware (e.g., microcode or basic input/output system (BIOS) code), or a combination of any two or more of these forms of processing logic.

The process begins by processing logic assigning a first modal input (by way of the interpreted actions associated with the first modal input) to control a first object on a display screen (processing block 700). Next, processing logic assigns a second modal input (by way of the interpreted actions associated with the second modal input) to control a second object on the display screen (processing block 702).

At this point the process flow diverges and both blocks 704 and 706 are performed simultaneously by processing logic. Specifically, processing logic controls the first object on the display screen using the first modal input (through the interpreted set of actions related to the first modal input) (processing block 704). At the same time processing logic controls the second object on the display screen using the second modal input (through the interpreted set of actions related to the second modal input) (processing block 706) and the process is finished.

Figure 8:
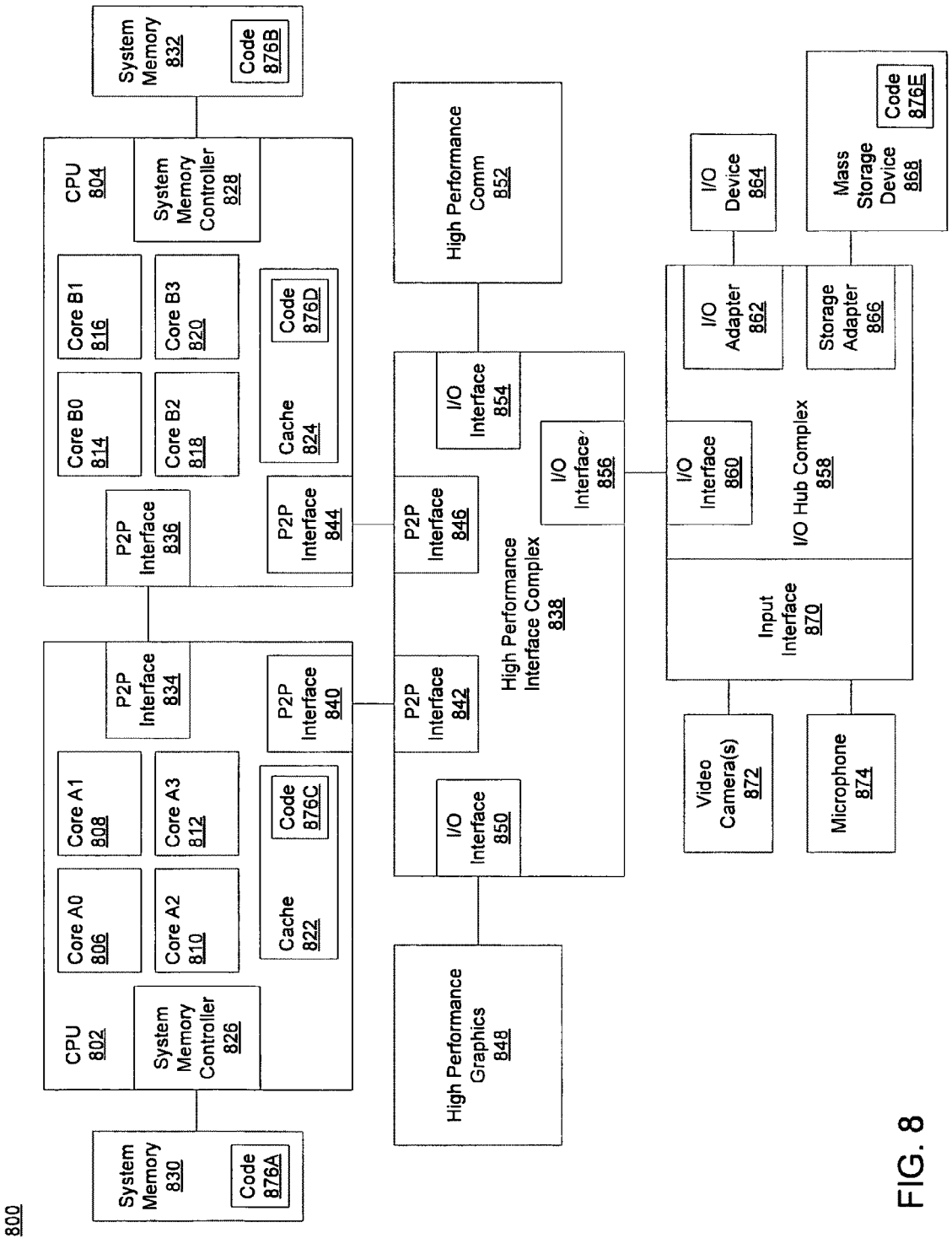
FIG. 8 illustrates an embodiment of a computer system implementing multi-modal input to control objects on a display.

FIG. 8 illustrates an embodiment of a computer system implementing multi-modal input to control objects on a display.

Computer system 800 is shown. In several embodiments the computer system 800 includes one or more central processing units (CPUs). Although in many embodiments there are potentially many CPUs, in the embodiment shown in FIG. 8 only two CPUs (802 and 804) are shown for clarity. CPUs 802 and 804 may be Intel® Corporation CPUs or CPUs of another brand. Each CPU includes one or more cores. In the embodiment shown, CPU 802 includes Core A0 (806), Core A1 (808), Core A2 (810), and Core A3 (812) and CPU 804 includes Core B0 (814), Core B1 (816), Core B2 (818), and Core. B3 (820).

In other embodiments, CPUs 802 and 804 may each have a number of cores either greater than or less than the four cores each are shown to have in FIG. 8. In many embodiments, each core (such as core A0 (806)) includes internal functional blocks such as one or more execution units, retirement units, a set of general purpose and specific registers, etc. If the cores shown in FIG. 8 are multi-threaded or hyper-threaded, then each hardware thread may be considered as a core as well.

CPUs 802 and 804 each may also include one or more caches, such as last level caches (LLCs) 822 and 824, respectively. In many embodiments that are not shown, additional caches other than caches 822 and 824 are implemented where multiple levels of cache exist between the execution units in each core and memory. In different embodiments the caches may be apportioned in different ways. Each of caches 822 and 824 may be one of many different sizes in different embodiments. For example, caches 822 and 824 each may be an 8 megabyte (MB) cache, a 16 MB cache, etc. Additionally, in different embodiments the cache may be a direct mapped cache, a fully associative cache, a multi-way set-associative cache, or a cache with another type of mapping. Each cache may include one large portion shared among all cores in the respective CPU or may be divided into several separately functional slices (e.g., one slice for each core). Each cache may also include one portion shared among all cores and several other portions that are separate functional slices per core.

In many embodiments, CPUs 802 and 804 each include their own system memory controller (826 and 828, respectively) to provide an interface to communicate with system memories 830 and 832. In other embodiments that are not shown, memory controllers 830 and 832 may be discrete devices or integrated within other devices in computer system 800.

System memory 830 and 832 may comprise dynamic random access memory (DRAM), such as a type of double data rate (DDR) DRAM, non-volatile memory such as flash memory, phase change memory (PCM), or another type of memory technology. System memories 830 and 832 may be general purpose memories to store data and instructions to be operated upon by CPUs 802 and 804, respectively. Additionally, there may be other potential devices within computer system 800 that have the capability to read and write to the system memories, such as a direct memory access (DMA)-capable I/O (input/output) device.

The link (i.e., bus, interconnect, etc.) that couples each CPU with each respective system memory may include one or more optical, metal, or other wires (i.e. lines) that are capable of transporting data, address, control, and clock information.

Furthermore, CPUs 802 and 804 may communicate with each other through a point-to-point (P2P) interface using P2P interface circuits 834 and 836, respectively. The P2P interface may include high-speed bi-directional serial links, separated pairs of uni-directional serial links, or links implemented in parallel, among others. Apart from communicating with each other, CPUs 802 and 804 may also communicate through the same type of P2P interface with a high performance interface complex 838. Specifically, CPU 802 may communicate with complex 838 through P2P interface circuitry 840 on the CPU side and P2P interface circuitry 842 on the complex 838 side and CPU 804 may communicate with complex 838 through P2P interface circuitry 844 on the CPU side and P2P interface circuitry 846 on the complex 838 side.

High performance interface complex 838 may provide an interface to any subsystems that require high data throughput. For example, high performance graphics subsystem 848 may communicate with the CPUs through I/O interface 850 and high performance communications subsystem 852 may communicate through I/O interface 854. High performance interface complex 838 may also include I/O interface 856 to communicate to an I/O hub complex 858, which utilizes I/O interface 860. The circuitry for each I/O interface shown in computer system 800 may be the same or may be different. For example, the I/O interface 850 coupling the high performance graphics subsystem 848 to the complex 838 may comprise a 16-lane Peripheral Component Interface (PCI)-Express protocol link, whereas the I/O interface 856 coupling the high performance interface complex 838 to the I/O complex 858 may utilize a different protocol.

The I/O hub complex 858 may provide a general communication interface between devices coupled to one or more I/O interconnects (i.e. busses) and the CPUs 802 and 804. For example, I/O hub complex 858 may include one or more I/O adapters, such as I/O adapter 862, which may provide an interface to allow I/O devices, such as I/O device 864 to be communicatively coupled to the rest of the computer system 800. For example, one I/O hub complex may be a Universal Serial Bus (USB) hub complex and another might be a legacy PCI hub complex. Storage adapter 866 may also be integrated into I/O hub complex 858. Storage adapter 866 provides a communication interface with mass storage device 868. The mass storage device 368 may be a hard disk drive, a solid state drive, a phase change memory array, or another form of mass storage.

An input interface 870 allows the computer system 800 to be coupled to input devices such as camera(s) 872 and microphone 874.

At least one embodiment of the processing logic capable of successfully implementing executing the CLMARK and FASTCMPXCHG instructions may be present in each core in computer system 300. This logic is represented by processing logic 400, 402, 404, and 406 in cores A0 (306), A1 (308), A2 (310), and A3 (312), respectively, as well as by processing logic 408, 410, 412, and 414 in cores B0 (314), B1 (316), B2 (318), and B3 (320), respectively. Furthermore, in other embodiments, the processing logic capable of successfully executing the CLMARK and FASTCMPXCHG instructions may be distributed throughout several circuits, logic units, or devices illustrated in FIG. 3.

Although not illustrated, other computer system implementations utilizing different layouts of CPUs, busses, memory, etc. are perfectly acceptable to implement the invention as well.

Additionally, logic to implement a process using multi-modal input to control objects on a display may reside in one or more locations in the computer system 800 at different times during operation. For example, the logic may comprise software code 876 implementing the process. This logic may be stored in system memory 830 or 832 (logic 876A or 876B), within cache 822 or 824 (logic 876C or 876D), within mass storage device 868 (logic 876E), or elsewhere within or external to the computer system 800. In other embodiments, the processing logic may be partially implemented in firmware or hardware within system 800.

Figure 9:
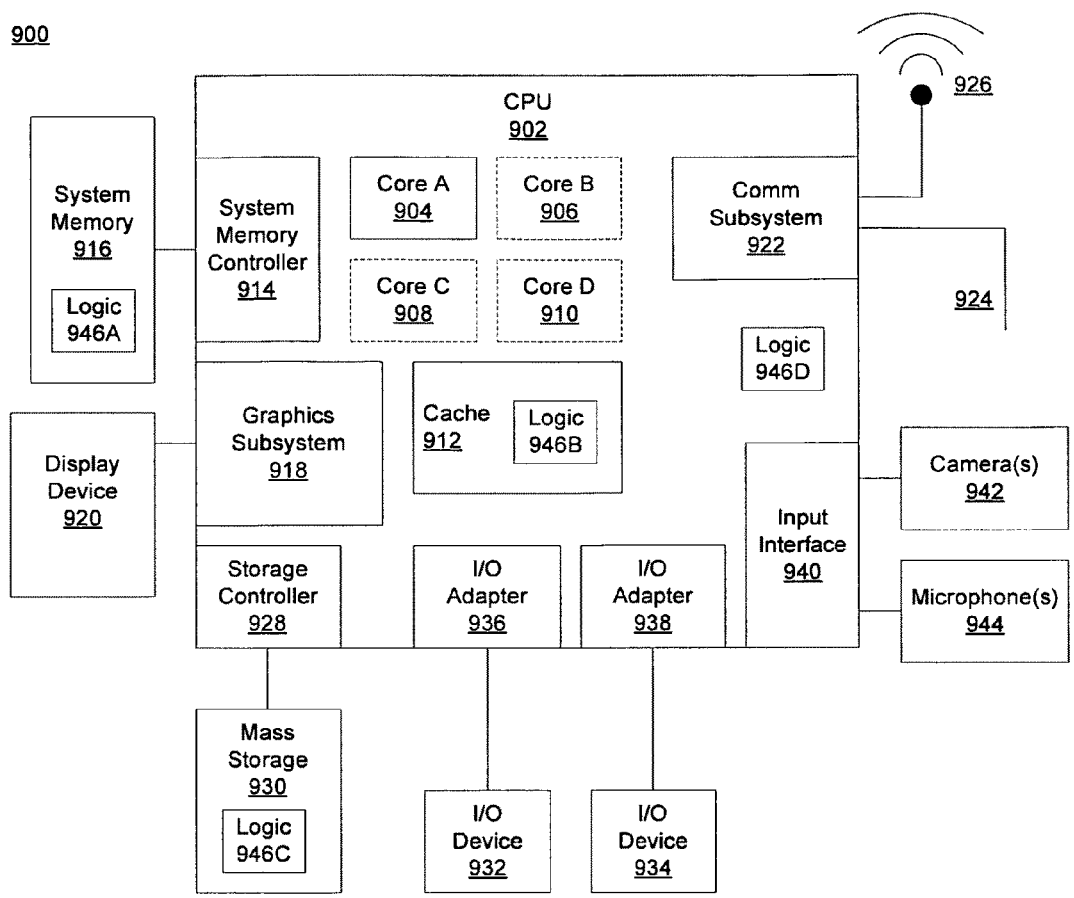
FIG. 9 illustrates another embodiment of a computer system implementing multi-modal input to control objects on a display.

FIG. 9 illustrates another embodiment of a computer system implementing multi-modal input to control objects on a display.

Computer system 900 is shown. The computer system in FIG. 9 generally comprises a system on a chip (SoC) layout. The SoC layout may be utilized in any type of computer system but is useful for small form factor computing devices, such as cellular phones, smart phones, set-top boxes, game consoles, and small laptop computers, such as netbook-type computing devices.

The computer system 900 many of the same components discussed above in relationship to FIG. 8 including a CPU 902. In a SoC layout, it is common to have a single CPU, though in other embodiments that are not shown, one or more additional CPUs are also located in computer system 900.

Again, CPU 902 may be Intel® Corporation CPU or CPU of another brand. CPU 902 includes one or more cores. In the embodiment shown, CPU 902 includes Core A (904), Core B (906), Core C (908), and Core D (910). Only one core is needed for operation of the computer system, but additional cores can distribute workloads and potentially increase overall system performance. CPU 902 may also include one or more caches, such as cache 912.

In many embodiments, CPU 902 includes a system memory controller 914 to provide an interface to communicate with system memory 916. CPU 902 also may include an integrated graphics subsystem 918, that is capable of computing pixel, vertex, and geometry data to be displayed on display device 920. CPU 902 additionally may include a communication subsystem 922 that provides an I/O interface to communicate with external devices. The communication subsystem 922 may include both wired 924 and wireless 926 interfaces.

CPU 902 also includes a storage controller 928 to provide an interface to a mass storage device 930. Additionally, CPU 902 is capable of communicating to I/O devices, such as I/O device 932 and I/O device 934 through I/O host controllers 936 and 938, respectively. The I/O adapters each may allow the CPU 902 to communicate with one or more I/O devices through a certain protocol. Finally, an input interface 940 allows the computer system to be coupled to input devices such as one or more cameras 942, one or more microphones 944, as well as other input devices. Many of the input devices may comprise modal input devices.

In many embodiments, logic, including potentially logic for implementing multi-modal input to control objects on the display device 920, may be present in any one of the following locations. When at least a portion of the logic is implemented in software, the logic may be present in system memory 916 (logic 946A), mass storage 930 (logic 946B), cache 912 (logic 946C), or potentially in any core (not shown). When at least a portion of the logic is implemented in hardware, the logic may be present in the general circuitry (uncore) of the CPU 902 outside of the cores (logic 946D).

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the description above, certain terminology is used to describe embodiments of the invention. For example, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a microcontroller, or the like.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

This invention claimed is:

1. A modular multi-modal input system, comprising:
a plurality of modal input devices, each modal input device to retrieve a stream of modal input data from a user;
modal interpretation logic to interpret each of the plurality of retrieved modal input data streams into a corresponding of set of actions;
modal pairing logic to assign each corresponding set of actions to control one of a plurality of displayed objects, wherein modal pairing logic implements a user interface to enable the user to explicitly assign each stream of modal input to a display object;
and modal control logic to control each displayed object by its assigned set of actions,
wherein each of the plurality of modal input devices captures a different type of modal input data corresponding with a different type of gameplay action,
wherein the modal pairing logic is operable to dynamically change a control assignment of a first displayed object of the plurality of displayed objects from a first modal input data stream of a first type of input device having a first type of data to a second modal input data stream of a second type of input device having a second type of data different from the first type of data.

2. The modular multi-modal input system of claim 1, wherein the modal pairing logic is operable to dynamically change a first modal input data stream of the plurality of modal input data streams from controlling a first displayed object to a second displayed object.

3. The modular multi-modal input system of claim 1, further comprising:
modal input management logic to manage two or more of the plurality of modal input devices as a group for the user, the group of modal input devices allowing the user to provide simultaneous control of two or more of the plurality of displayed objects.

4. The modular multi-modal input system of claim 3, wherein at least two of the plurality of modal input devices in the group are hands-free modal input devices.

5. The modular multi-modal input system of claim 3, wherein a first modal input device in the group is of a different modal type than a second modal input device in the group.

6. The modular multi-modal input system of claim 1, wherein at least one modal input device of the plurality of modal input devices is one of a video camera, a microphone, and an accelerometer.

7. A method, comprising:
retrieving a plurality of streams of modal input data from a user, each stream of modal input data received from a different one of a plurality of modal input devices;
interpreting each of the plurality of retrieved modal input data streams into a corresponding of set of actions;
assigning each corresponding set of actions to control one of a plurality of displayed objects;
implementing a user interface to enable the user to explicitly assign stream of modal input to a display object;
controlling each displayed object by its assigned set of actions; and
dynamically changing a control assignment of a first displayed object of the plurality of displayed objects from a first modal input data stream of a first type of input device having a first type of data to a second modal input data stream of a second type of input device having a second type of data different from the first type of data,
wherein each of the plurality of modal input devices captures a different type of modal input data corresponding with a different type of gameplay action.

8. The method of claim 7, further comprising:
dynamically changing a first modal input data stream of the plurality of modal input data streams from controlling a first displayed object to a second displayed object.

9. The method of claim 7, further comprising:
managing two or more of the plurality of modal input devices as a group for the user, the group of modal input devices allowing the user to provide simultaneous control of two or more of the plurality of displayed objects.

10. The method of claim 9, wherein at least two of the plurality of modal input devices in the group are hands-free modal input devices.

11. The method of claim 9, wherein a first modal input device in the group is of a different modal type than a second modal input device in the group.

12. The method of claim 7, wherein at least one modal input device of the plurality of modal input devices is one of a video camera, a microphone, and an accelerometer.

13. A non-transitory, machine-readable medium having stored thereon instructions, which if executed by a machine causes the machine to perform a method comprising:
retrieving a plurality of streams of modal input data from a user, each stream of modal input data received from a different one of a plurality of modal input devices;
interpreting each of the plurality of retrieved modal input data streams into a corresponding of set of actions;
assigning each corresponding set of actions to control one of a plurality of displayed objects rendered on a display device;
implementing a user interface to enable the user to explicitly assign each stream of modal input to a display object;
controlling each displayed object by its assigned set of actions;
and dynamically changing a control assignment of a first displayed object of the plurality of displayed objects from a first modal input data stream of a second type of input device having a second type of data different from the first type of data to a second modal input data stream of a second type of input device having a second type of data different from the first type of data,
wherein each of the plurality of modal input devices captures a different type of modal input data corresponding with a different type of gameplay action.

14. The non-transitory, machine-readable medium of claim 13, wherein the performed method further comprises:
dynamically changing a first modal input data stream of the plurality of modal input data streams from controlling a first displayed object to a second displayed object.

15. The non-transitory, machine-readable medium of claim 13, wherein the performed method further comprises:
managing two or more of the plurality of modal input devices as a group for the user, the group of modal input devices allowing the user to provide simultaneous control of two or more of the plurality of displayed objects.

16. The non-transitory, machine-readable medium of claim 15, wherein at least two of the plurality of modal input devices in the group are hands-free modal input devices.

17. The non-transitory, machine-readable medium of claim 15, wherein a first modal input device in the group is of a different modal type than a second modal input device in the group.

18. The non-transitory, machine readable medium of claim 13, wherein at least one modal input device of the plurality of modal input devices is one of a video camera and a microphone.

19. The modular multi-modal input system of claim 1, wherein the user interface comprises a first list of available streams of modal input and a second list of available display objects to control.

20. The method of claim 7, wherein the user interface comprises a first list of available streams of modal input and a second list of available display objects to control.

21. The non-transitory, machine-readable medium of claim 13, wherein the user interface comprises a first list of available streams of modal input and a second list of available display objects to control.

\* \* \* \* \*